US009880740B2

(12) United States Patent
Tati et al.

(10) Patent No.: US 9,880,740 B2
(45) Date of Patent: Jan. 30, 2018

(54) RAPID VIRTUAL MACHINE POWER-ON WITH ITERATIVE SWAP SPACE RESERVATION

(71) Applicant: VMware, Inc., Palo Alto, CA (US)

(72) Inventors: Kiran Tati, Santa Clara, CA (US); Ishan Banerjee, Santa Clara, CA (US); Jui-Hao Chiang, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 97 days.

(21) Appl. No.: 14/973,004

(22) Filed: Dec. 17, 2015

(65) Prior Publication Data

US 2017/0177238 A1 Jun. 22, 2017

(51) Int. Cl.
*G06F 12/02* (2006.01)
*G06F 3/06* (2006.01)

(52) U.S. Cl.
CPC .......... *G06F 3/0607* (2013.01); *G06F 3/0631* (2013.01); *G06F 3/0685* (2013.01)

(58) Field of Classification Search
None
See application file for complete search history.

(56) References Cited

U.S. PATENT DOCUMENTS

| 6,098,158 | A  | * | 8/2000  | Lay ...................... G06F 9/4401 711/161 |
| 7,624,240 | B1 | * | 11/2009 | Colbert ................. G06F 9/4856 711/159 |
| 2009/0070776 | A1 | * | 3/2009 | Dahlstedt .............. G06F 9/5016 719/312 |

* cited by examiner

*Primary Examiner* — Duc Doan
(74) *Attorney, Agent, or Firm* — Patterson & Sheridan LLP

(57) ABSTRACT

A computer system provides for rapid power-on operations on virtual machines (VMs) with a virtual memory space including a reservation from machine memory and a small or no swap size. When the computer system powers on a VM, the computer system creates a physical memory space for the VM with a size larger than the minimum memory reservation for the VM and a swap space with a size less than the difference between the size of the virtual memory space and the minimum memory reservation. Subsequently, the computer system iteratively decreases the size of the physical memory space for the VM and increases the size of the swap space for the VM until the size of the physical memory space equals the minimum size of the memory reservation, which may be the amount of the virtual space that is guaranteed to be backed by machine memory.

18 Claims, 4 Drawing Sheets

RAPID VIRTUAL MACHINE POWER-ON WITH ITERATIVE SWAP SPACE RESERVATION

BACKGROUND

Virtual machines (VMs) consume memory and other hardware resources, which are allocated to a VM when the virtual machine is powered on. Powering on a VM includes a number of steps, all of which are to be completed before the VM is considered to have been powered on. As part of the power-on process, a sufficient amount of memory may be allocated to the VM such that the VM will not be terminated due to an insufficient memory reservation in hardware. A sufficient memory reservation may include both a reservation of physical random access memory (RAM) and swap space on a persistent storage device, such as a hard disk drive or a solid state drive.

Memory allocation may utilize a "thick swap" strategy, in which a hypervisor creates a swap space with an initial size equal to a minimum amount of the virtual memory space to be backed by physical memory (RAM and/or persistent storage) and grows the swap space to the virtual memory space size before declaring that a VM has been powered on. If the hypervisor fails to create the swap space and grow the swap space to the virtual memory space size (which may not occur for many minutes), the hypervisor can declare that the VM has failed to power on and release any resources acquired during the power-on operations. Using a thick swap strategy, storage blocks for VM memory pages that may need to be swapped out from physical memory into the swap space are guaranteed while the VM operates (i.e., remains powered on).

In another strategy, known as a "thin swap" strategy, a hypervisor creates a swap space with an initial size equal to a minimum amount of the virtual memory space to be backed by physical memory and declares that a VM has been powered on. In some cases, the hypervisor may fail to acquire storage blocks when memory pages are swapped into the swap space. When such a failure occurs, operation of a VM may be abruptly terminated. While a "thin swap" strategy may result in a VM being powered on more rapidly, a "thin swap" strategy may not provide for reliable operation of a VM.

Different kinds of memory generally have different cost and performance characteristics. For example, RAM is generally more expensive per byte than persistent storage, but may provide faster read/write access to data. In VM power-on operations, RAM allocation is generally not a time-intensive operation, unlike swap space reservation on a persistent storage device, which may take many minutes to acquire before the hypervisor can declare VM power-on operations to be complete.

SUMMARY

One or more embodiments implement "thick swap" memory reservation in machine memory and storage for VMs that allow for rapid power-on of a VM. According to embodiments, a hypervisor initiates a power-on procedure for a virtual machine. The VM includes a virtual memory space configured to be backed by a combination of swap space and machine memory. The hypervisor creates a physical memory space for the VM in host machine memory with a size larger than the minimum memory reservation for the VM and a swap space for the VM in host storage with a size less than the difference between the size of the virtual memory space and the minimum memory reservation. The hypervisor completes the power-on procedure of the VM and subsequently iteratively allocates storage blocks to the swap space associated with the VM and deallocates memory pages from the physical memory space associated with the VM to the size of the minimum memory reservation.

As used herein, allocation of physical memory space may include, without limitation, increasing an amount of memory assigned to the physical memory space associated with the VM or updating one or more counters indicating that space in physical memory is attributed to or reserved for the physical memory space associated with the VM. As used herein, deallocation of physical memory space may include, with limitation, reducing an amount of memory assigned to the physical memory space associated with the VM or updating one or more counters indicating that a space in physical memory is no longer attributed to or reserved for the physical memory space associated with the VM.

As used herein, allocation of swap space may include, without limitation, increasing the number of storage blocks assigned to the swap space or updating one or more counters indicating that a storage block is attributed to or reserved for the swap space associated with the VM. As used herein, deallocation of swap space may include, without limitation, reducing the number of storage blocks (or memory pages) assigned to the swap space or updating one or more counters indicating that a storage block is attributed to or reserved for the swap space associated with the VM.

In the embodiments, VMs may be declared to be powered on when a virtual memory space is created substantially in machine memory, while time-intensive memory reservation in storage is performed iteratively. In some examples, where an amount of remaining machine memory is less than the size of a virtual memory space for a VM, the VM may be allocated the remaining machine memory as the physical memory space associated with the VM and a swap space equal to the difference of the size of the virtual memory space and the amount of remaining machine memory. Subsequently, the hypervisor iteratively allocates storage blocks to the swap space and deallocates memory pages from the physical memory space. Advantageously, initially allocating a virtual memory space to a VM from machine memory and iteratively growing a swap space may allow for more rapid power-on of VMs with thick swap spaces, which provides memory resource guarantees to a VM such that the VM will not be terminated for a lack of allocated memory.

DETAILED DESCRIPTION

Figure 1:
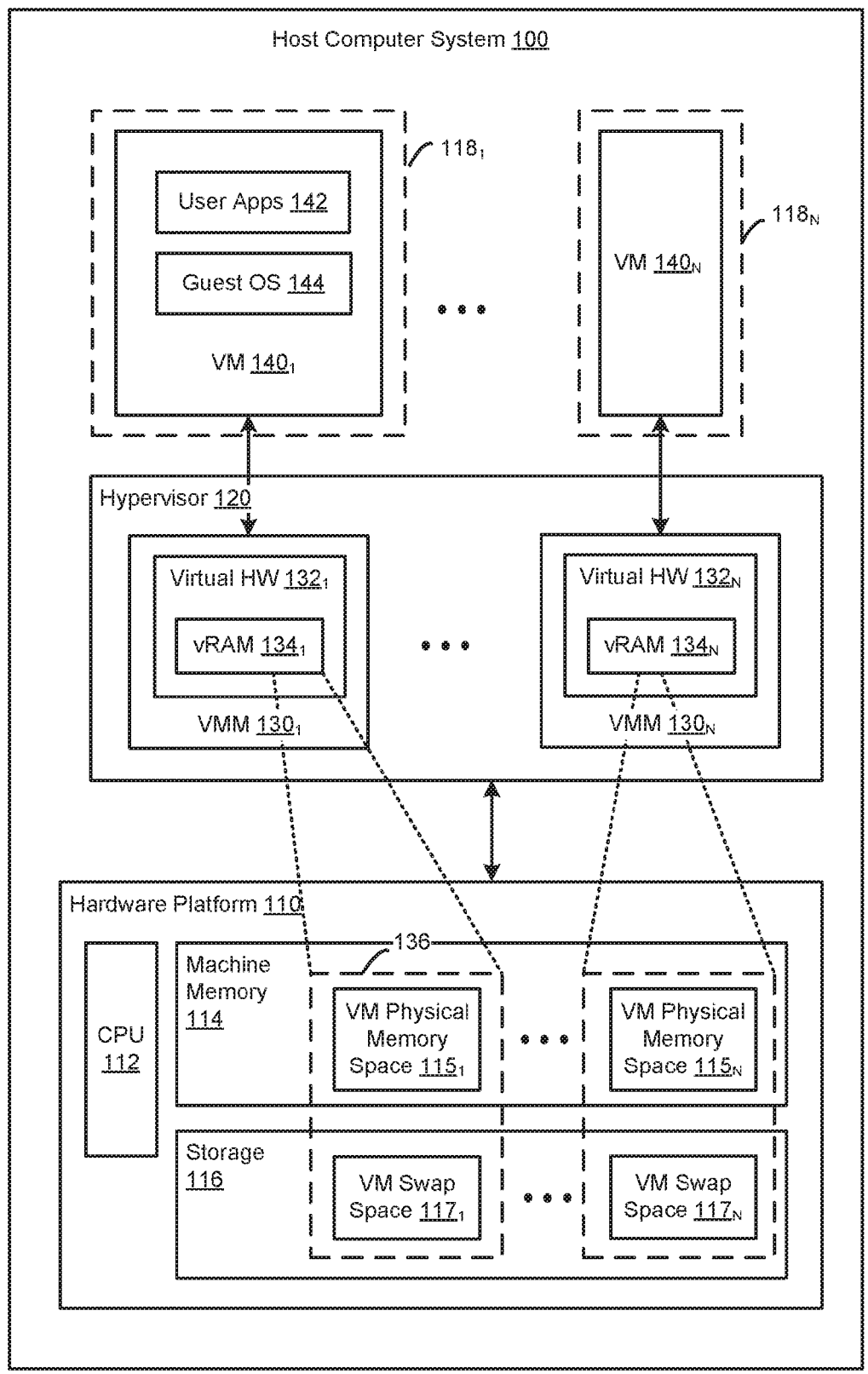
FIG. 1 is a block diagram of a virtualized host computer system that implements iterative swap space growth for rapid VM power-on procedures, according to one or more embodiments.

FIG. 1 is a block diagram of a host computer system 100 that is configured to rapidly power on host VMs using an initial memory reservation and iteratively grow a VM swap space after completion of VM power-on operations, according to one or more embodiments. The implementation is described herein in the context of a virtualized computing system where the system software is a virtualization software layer, e.g. hypervisor 120, which supports execution of virtual computing instances, such as a virtual machine (VM). It should be recognized that other embodiments may be implemented in a computer system where the system software is an operating system.

Host computer system 100 may be constructed on a desktop, laptop, mobile, tablet, or server grade hardware platform 110. Hardware platform 110 includes one or more central processing units (CPU) 112, host machine memory 114, host storage 116, and other standard hardware components such as network interface controllers (not shown) that connect host computer system 100 to a network. Host machine memory 114 may be implemented as a number of banks of random access memory (RAM). Host storage 116 represents one or more local storage devices (e.g., one or more hard disks, flash memory modules, solid state disks, and optical disks) and/or a storage interface that enables host computing system 100 to communicate with one or more network data storage systems. Examples of a storage interface are a host bus adapter (HBA) that couples host computing system 100 to one or more storage arrays, such as a storage area network (SAN) or a network-attached storage (NAS), as well as other network data storage systems. Hypervisor 120 is also installed on top of hardware platform 110, and provides operating system functionality (e.g., process creation and control, file system, process threads, etc.) as well as CPU scheduling and memory scheduling across multiple VM execution spaces $118_1$-$118_N$ within hypervisor 120. Within each VM execution space $118_1$-$118_N$, a VM process is executed to instantiate corresponding VMs $140_1$-$140_N$. Virtual machine monitors (VMM) $130_1$-$130_N$ implement the virtual system support needed to coordinate operations between hypervisor 120 and their respective VMs $140_1$-$140_N$.

As shown, each VMM $130_1$-$130_N$ manages a corresponding virtual hardware platform (i.e., virtual hardware platforms $132_1$-$132_N$) that includes emulated hardware such as virtual CPUs (vCPUs) and guest physical memory. Each virtual hardware platform 132 supports the installation of a guest operating system (OS) 144. In each instance, guest OS 144 provides user applications 142 running in the virtual machine an interface to the virtual hardware platform of the virtual machine.

Each VM 140 consumes memory based on its configured size, plus additional overhead memory for virtualization. The configured size is a construct maintained by the virtualization layer (i.e., hypervisor and/or VMMs) for the VM, and is the amount of memory that is presented to guest operating system 144. However, the configured size is independent of the amount of physical RAM (i.e., machine memory 114) that is allocated to the virtual machine, which depends on various resource control settings. For example, a first VM $140_1$ may be configured with a configured size of 1 GB. When guest operating system 144 powers on, guest OS 144 detects that the guest OS is running on a dedicated machine with 1 GB of physical memory. The actual amount of physical host memory allocated to the virtual machine depends on the VM's memory resource settings and memory contention on the host. In some cases, the virtual machine might be allocated the full 1 GB. In other cases, the virtual machine might receive a smaller allocation. Regardless of the actual allocation, the guest operating system continues to behave as though the guest OS is running on a dedicated machine with 1 GB of physical memory.

Each virtual hardware platform 132 includes a virtual memory space 134 (i.e., $134_1$-$134_N$) usable by the respective VM 140. When guest OS 144 and user applications 142 execute on VM 140, guest OS 144 and user applications 142 read from and write to the virtual memory space, and hypervisor 120 handles translation from the virtual memory space to real locations in memory. The virtual memory space may appear as a virtualized physical memory space to guest OS 144, and guest OS 144 may create a guest virtual memory space for use by one or more user applications 142.

Virtual memory space 134 may be mapped to one or more locations in host machine memory 114 (e.g., host system RAM), referred to as "VM physical memory." In some cases (e.g., memory over-commitment), memory data in the virtual memory space can be stored in one or more locations in host storage 116 (e.g., one or more local storage devices and/or one or more network data storage systems), referred to as a "swap space." Swap space 117 (i.e., $117_1$-$117_N$) can be implemented as one or more files designated exclusively on a per-VM basis, or a shared configuration, stored in host storage 116 VM physical memory space 115 in host machine memory 114 is generally used to store a number of recently used memory pages. Meanwhile, swap space 117 stored in host storage 116 is generally used to store the remainder of the virtual memory space. When guest OS 144 or a user application 142 attempts to access a memory page that is not stored in VM physical memory space 115 in host machine memory 114, memory management functionality in hypervisor 120 or CPU 112 may swap in a page from swap space 117 in host storage 116 into VM physical memory space 115 in host machine memory 114. In some cases, to accommodate the swapped-in page, memory management functionality in hypervisor 120 or CPU 112 may correspondingly swap out a page from VM physical memory space in host machine memory 114 to swap space 117 in host storage 116.

During operation, hypervisor 120 and/or VMMs 130 maintains and manages a number of operating parameters and settings for each VM, including a virtual memory space size (i.e., configured size), a memory reservation, and a swap space size. The virtual memory space size indicates the size of a VM's memory address space. The memory reservation indicates a minimum amount of the virtual memory space that is to be backed by machine memory (i.e., a size of the virtual address space that is guaranteed by the hypervisor to be backed by in-RAM VM physical memory space 115). The swap space size indicates the size of the virtual address space that is backed by an on-disk swap space 117. The swap space size of the virtual memory may be backed by machine memory, if available, or otherwise stored on disk. In one implementation, the swap space size may be calculated as the difference between the virtual memory space size and the memory reservation.

Hypervisor 120 is configured to manage a virtual memory space for each VM 140 operating in computing system 100. Generally, on VM power-on, hypervisor 120 may generate a virtual memory space including VM physical memory space 115 in host machine memory 114 and swap space 117 in host storage 116. As described in further detail herein, VM 140 may be powered on with VM physical memory space 115 that is larger than the minimum memory reservation configured for VM 140 and a swap space 117 that is smaller than the difference between the size of the virtual memory space and the size of the minimum memory reservation. After VM 140 is powered on, hypervisor 120 may iteratively adjust the size of VM physical memory space 115 and swap space 117 to gradually reduce the size of VM physical memory space 115 to the minimum memory reservation. Correspondingly, hypervisor 120 may increase the size of swap space 117 to compensate for the reduction in the size of VM physical memory space 115, such that the total size of VM physical memory space 115 and swap space 117 equals the configured virtual memory space size for VM 140.

It should be recognized that the various terms, layers and categorizations used to describe the virtualization components in FIG. 1 may be referred to differently without departing from their functionality or the spirit or scope of the invention. For example, virtual hardware platforms $132_1$-$132_N$ may be considered to be part of virtual machine monitors (VMM) $130_1$-$130_N$. Alternatively, virtual hardware platforms $132_1$-$132_N$ may be considered to be separate (e.g., as a component of its corresponding virtual machine since such platforms include the hardware emulation components for the virtual machine) from VMMs $130_1$-$130_N$, and VMMs $130_1$-$130_N$ may be considered to be separate from hypervisor 120. One example of hypervisor 120 that may be used is included as a component of VMware® vSphere™, which is commercially available from VMware, Inc. of Palo Alto, Calif. It should further be recognized that other virtualized computer systems are contemplated, such as hosted virtual machine systems, where the hypervisor is implemented in conjunction with a host operating system.

Figure 2:
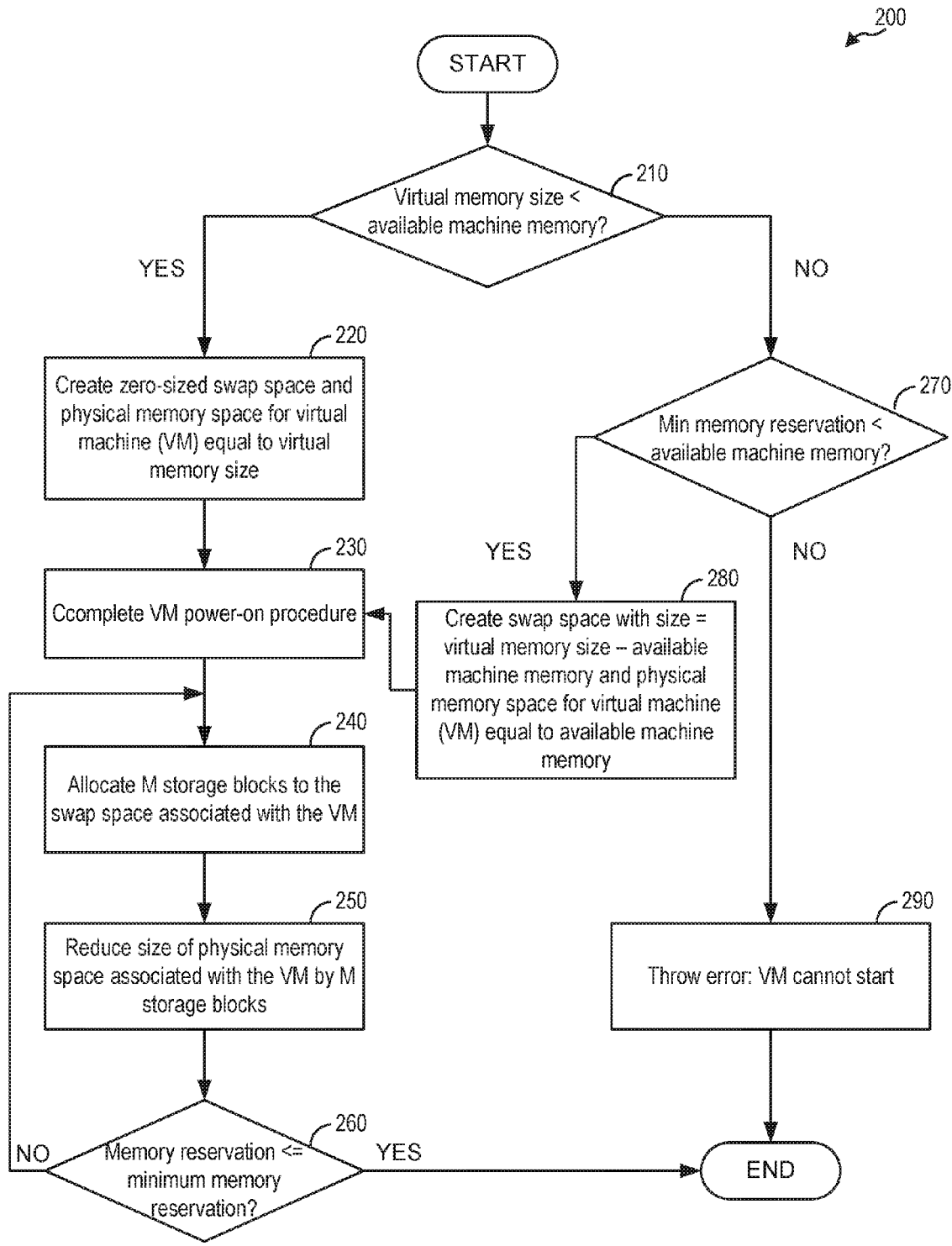
FIG. 2 is a flow diagram illustrating a method for rapidly powering on a VM, according to one or more embodiments.

FIG. 2 illustrates a flow diagram of method 200 for powering on a VM and iteratively growing a VM swap space, according to an embodiment. In the embodiments illustrated herein, the steps of method 200 are carried out by hypervisor 120 when a hypervisor 120 performs power-on operations with respect to a specific VM.

Method 200 begins at step 210, where, upon initiating a power-on procedure for a VM, hypervisor 120 determines if the size of the virtual memory space is less than the available machine memory. As discussed above, the VM is generally associated with a virtual memory space configuration which defines the size of the virtual memory space and the minimum size of the virtual memory space that is to be backed by host machine memory 114 (i.e., the minimum size of the memory reservation in host machine memory 114). To track the amount of available machine memory, hypervisor 120 may track allocations and deallocations of machine memory (e.g., from powering on and shutting down VMs) and continually maintain a variable indicating the available amount of machine memory 114 on computing system 100.

If the size of the virtual memory space is less than the available machine memory, at step 220, hypervisor 120 creates a zero-sized swap space and sets a memory reservation for the VM equal to the size of the virtual memory space. In one implementation, hypervisor 120 creates a swap file associated with the VM (e.g., ".vmem") on disk but does not allocate any storage blocks at the time the VM is powered on. At step 230, hypervisor 120 completes the VM power-on procedure. At this time, in the case where a zero-sized swap space has been created, the virtual memory space for the VM is entirely backed by machine memory 114. While the discussed embodiments refer to the size of the memory reservation and the VM physical memory space interchangeably, alternative embodiments may use other techniques for manipulating the size of the VM physical memory space 115 other than setting the memory reservation setting. For example, hypervisor 120 need not reserve any memory for the VM when the VM is powered on (e.g., creates a zero-sized swap space and a zero-sized memory reservation) and may subsequently, as discussed below, iteratively grow the swap space. In another example, hypervisor 120 may create a system-wide common swap space to back the minimum memory reservation for each VM managed by hypervisor 120. The system-wide common swap space may be created when the host physical machine is powered on, and as guest VMs are powered on, hypervisor 120 transfers memory from the system-wide common space to a VM swap space. Subsequently, hypervisor 120 may iteratively grow the swap space, as discussed below.

After the hypervisor 120 completes the VM power-on procedure, hypervisor 120 begins to iteratively increase the size of swap space 117 and iteratively decrease the size of the memory reservation for the VM (i.e., for the VM physical memory space 115). To do so, at step 240, hypervisor 120 allocates an additional M storage blocks (e.g., memory pages) to swap space 117 associated with the VM. M, or the incremental growth parameter, may be specified on a per-VM basis (i.e., different VMs have different corresponding values of M), or as a default constant defined in hypervisor 120. M may specify a fixed number of storage blocks by which the swap space grows and the memory reservation decreases during each iteration. In some cases, hypervisor 120 may determine the size of M at the time the swap space is resized, and M can be changed for each iteration of swap space growth. When the allocation is completed, the new size of swap space 117 should be M storage blocks (e.g., pages) larger than the size of the swap space before execution of step 240.

At step 250, subsequent to increasing the size of the swap space, hypervisor 120 reduces the memory reservation for the VM by M memory pages. As discussed above, M may be specified as a number of storage blocks or memory pages by which the size of the memory reservation is reduced on a per-VM or hypervisor-wide basis. After the hypervisor completes reducing the size of the memory reservation (e.g., by deallocating storage blocks or memory pages from the memory reservation, by altering "free" memory counters, and so on), the size of VM physical memory space 115 should be M memory pages smaller than the size of VM physical memory space 115 before execution of step 250.

At step 260, hypervisor 120 determines if the size of VM physical memory space 115 is equal to the minimum memory reservation size. If the size of VM physical memory space 115 exceeds the minimum memory reservation size, hypervisor 120 returns to step 240 to begin another iteration of increasing the size of the swap space and decreasing the size of the memory reservation. In some cases, hypervisor 120 may adjust M such that the next iteration of increasing the size of the swap space and decreasing the size of the memory reservation results in the size of VM physical memory space 115 equaling the minimum memory reservation size. Otherwise, the size of VM physical memory space 115 is equal to the minimum memory reservation size, and method 200 ends.

If, however, the size of the virtual memory space exceeds the available machine memory, hypervisor 120 may not create a thick swap space solely from machine memory 114. Thus, method 200 proceeds from step 210 to step 270, where hypervisor 120 determines whether the minimum memory reservation is less than the available space in machine memory 114. If the minimum memory reservation is less than the available space in machine memory 114, computing system 100 has sufficient free space in machine memory 114 to power on the VM.

If hypervisor 120 determines that computing system 100 has sufficient free space in machine memory 114 to power on the VM, hypervisor 120 can power on the VM, and method 200 proceeds to step 280, where hypervisor 120 creates swap space 117 having an initial first size equal to the difference between the virtual memory size and the available space in machine memory. Concurrently, hypervisor 120 sets a memory reservation for the VM to a second size equal to the size of the memory reservation to the available machine memory. When hypervisor 120 completes creation of the VM physical memory space and swap space for the VM, the size of the memory reservation should be larger than the minimum memory reservation configured for the VM, and the size of the swap space should be smaller than the difference between the size of the virtual memory space and the size of the minimum memory reservation.

When hypervisor 120 completes creating the swap space and physical memory space for the VM, method 200 proceeds to step 230, where, as discussed above, the hypervisor completes the VM power-on procedure. Subsequently, hypervisor 120 may iteratively increase the size of swap space 117 and decrease the size of VM physical memory space 115 until the size of VM physical memory space 115 decreases to the minimum memory reservation, as discussed above.

If, at step 270, the minimum memory reservation exceeds the available space in machine memory, hypervisor 120 may not start the VM because computing system 100 may not be able to meet the minimum memory reservation for the VM. Method 200 thus proceeds to step 290, where hypervisor 120 throws an error indicating that the VM cannot be started. Hypervisor 120 discontinues the power-on operations for the VM, and method 200 ends.

In some cases, hypervisor 120 may fail to create a swap space 117 in storage 116 during a VM power-on process. If such a failure occurs, the VM may fail to power on, and hypervisor 120 may log the failure to power on the VM and report the failure event to a system administrator.

Figure 3:
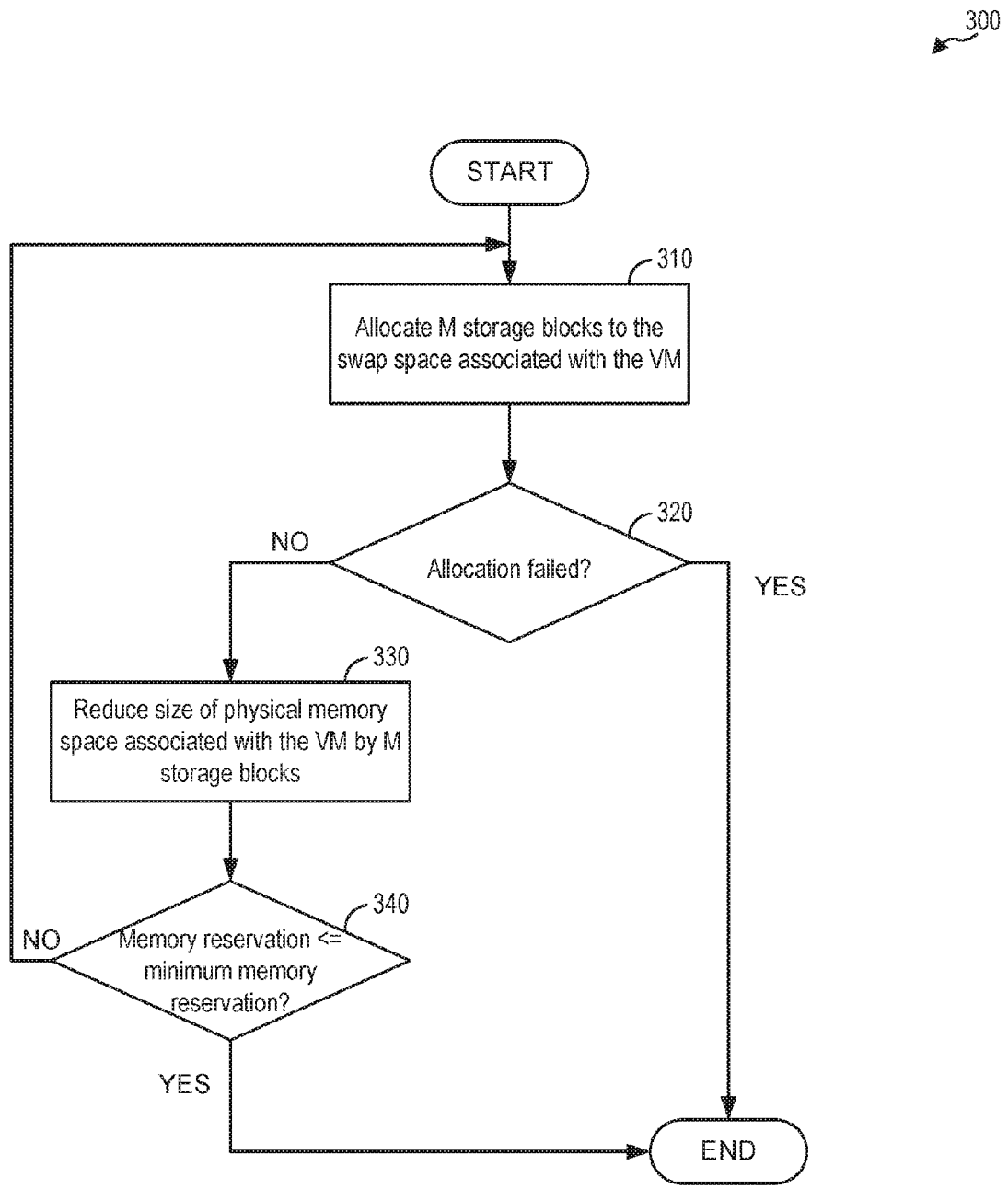
FIG. 3 is a flow diagram illustrating method for iteratively growing a swap space and decreasing a memory reservation for a VM, according to one or more embodiments.

In some cases, hypervisor 120 may fail to iteratively grow the swap space 117 in storage 116. In such a case, as illustrated in FIG. 3 and described in further detail below, hypervisor 120 may discontinue attempts to iteratively grow the swap space 117 and decrease the size of VM physical memory space 115. VM physical memory space 115 may remain larger than the minimum memory reservation; however, because the VM remains backed by the full virtual memory space, the VM need not be terminated in response to a failure of the hypervisor 120 to iteratively grown the swap space 117 for a VM.

FIG. 3 illustrates a flow diagram for a method 300 for handling a failure to iteratively increase the size of a swap space for a VM subsequent to VM power-on procedures where hypervisor 120 creates a VM physical memory space with an initial size in excess of the minimum memory reservation, according to an embodiment. In the embodiments illustrated herein, the steps of method 300 are carried out by a hypervisor 120 after hypervisor powers on a VM and creates a virtual memory space with VM physical memory space 115 sized in excess of the minimum memory reservation.

As illustrated, method 300 starts at step 310, where, similar to step 240 discussed above, the hypervisor attempts to allocate M storage blocks (e.g., pages) to the swap space associated with the VM. As discussed above, M, or the incremental growth parameter, generally defines a number of storage blocks by which each iteration of method 300 grows the size of the swap space and decreases the size of the memory reservation in host machine memory. When the allocation is completed, the new swap size should be M storage blocks larger than the size of the swap space before execution of step 310.

After the hypervisor 120 increases the size of the swap space (e.g., by allocating storage blocks to the swap space or by adjusting one or more counters to indicate that storage blocks are attributed or reserved for a particular swap space), method 300 proceeds to step 320, where the hypervisor 120 determines if the swap space increase operations failed. Hypervisor 120 can determine that the swap space increase operations failed, for example, by detecting that the size of the swap space did not change after executing step 310, detecting a segmentation fault, or detecting a disk write fault, and so on. If the allocation failed, indicating a failure to grow the swap space, method 300 may terminate. At this time, the virtual memory space for the VM is backed by a full virtual memory allocation, though the memory reservation in machine memory 114 for the VM exceeds the minimum memory reservation.

Otherwise, the swap space increase operations succeeded, and method 300 proceeds to step 330, where, similar to step 250 discussed above, the hypervisor 120 reduces the size of VM physical memory space 115 by M memory pages. Reducing the memory reservation for the VM may include, for example, deallocating M memory pages from the memory reservation in host machine memory 114 or altering one or more memory counters to reflect a reduction in the size of the memory reservation in host machine memory 114. When step 330 is completed, the size of the memory reservation should be M memory pages smaller than the size of the memory reservation prior to executing step 330.

At step 340, similar to step 260 discussed above, the hypervisor 120 compares the size of VM physical memory space 115 to the minimum memory reservation size. If the size of VM physical memory space 115 exceeds the minimum memory reservation size, method 300 returns to step 310 to continue iteratively increasing the size of swap space 117 and decreasing the size of VM physical memory space 115 in machine memory until the size of VM physical memory space 115 equals the minimum memory reservation. Otherwise, method 300 ends with the VM having VM physical memory space 115 with a size of the minimum memory reservation and a swap space sized as the difference between the size of the virtual memory space and the minimum memory reservation.

By creating a VM physical memory space 115 in machine memory 114 equal to the size of the virtual memory space for a VM, hypervisor 120 can power on VMs faster than when hypervisor 120 creates a full-sized swap space 117 in storage 116 (i.e., a swap space with a size of the difference between the size of the virtual memory space and the size of the minimum memory reservation). In some cases, creating a VM physical memory space 115 in machine memory 114 equal to the size of the virtual memory space for a VM may result in power-on times for a VM being smaller by 2-3 orders of magnitude. If insufficient space is available in machine memory to create a VM physical memory space 115 equal to the size of the virtual memory space for a VM, but is sufficient to create a VM physical memory space 115 that is larger than the minimum memory reservation, power-on time for the VM generally remains shorter than when hypervisor 120 creates a full-sized swap space 117 for a VM during power-on operations.

An example pseudocode sequence that iteratively reduces the size of VM physical memory space 115 in machine memory 114 and grows the size of swap space 117 in storage 116 is set forth below in Table 1.

TABLE 1

Require: memsize, resv, M

```
1.      i = memsize
2.      while i > resv do
3.          ret = extend swap by M
4.          if ret == TRUE then
5.              i = i - M
6.              set memory reservation to i
7.          else
8.              break
9.          end if
10.     end while
```

Prior to execution of the above pseudocode sequence, hypervisor 120 will have created a virtual memory space for VM 140 having a total size (memory reservation+swap space) of memsize, VM physical memory space 115 in host machine memory 114 having a size of memsize, and swap space 117 in host storage 116 having a size of 0. resv represents the minimum amount of the virtual memory space that has been configured and guaranteed to be backed by VM physical memory space 115 in host machine memory 114. Finally, as discussed above, M, the incremental growth parameter, represents an amount of space to iteratively allocate to swap space 117 and deallocate from VM physical memory space 115.

In line 1, hypervisor 120 sets a counter variable to memsize. The counter variable generally represents the current size of VM physical memory space 115 for VM 140. At line 2, iterative growth of swap space 117 and shrinking of VM physical memory space 115 begins. As discussed above, the iterative process ends when i, or the current size of VM physical memory space 115, is no longer greater than resv.

At line 3, hypervisor 120 calls a function which attempts to increase the size of swap space 117 by M storage bocks (or pages). The function returns binary TRUE if the attempt succeeds, or binary FALSE if the attempt fails. At line 4, hypervisor 120 determines whether the attempt to increase the size of swap space 117 succeeded. If the attempt succeeded, hypervisor 120 proceeds to line 5, where hypervisor 120 updates the counter variable to reflect a deallocation of M pages from VM physical memory space 115. Subsequently, at line 6, hypervisor 120 deallocates M pages from VM physical memory space 115.

If, at line 4, hypervisor 120 determined that the attempt to increase the size of swap space 117 failed, hypervisor 120 proceeds to line 8, where hypervisor 120 discontinues any further attempts to decrease the size of VM physical memory space 115 and correspondingly increase the size of swap space 117 associated with VM 140.

While M is illustrated as fixed in the pseudocode sequence listed above, hypervisor 120 may adaptively alter the value of M as additional iterations of a swap space increase and memory reservation decrease operation occur. For example, as discussed above, M may be adjusted such that the final iteration of a swap space increase and memory reservation decrease operation results in the size of a memory reservation in VM physical memory space 115 equaling the size of the minimum memory reservation defined for the VM.

Figure 4:
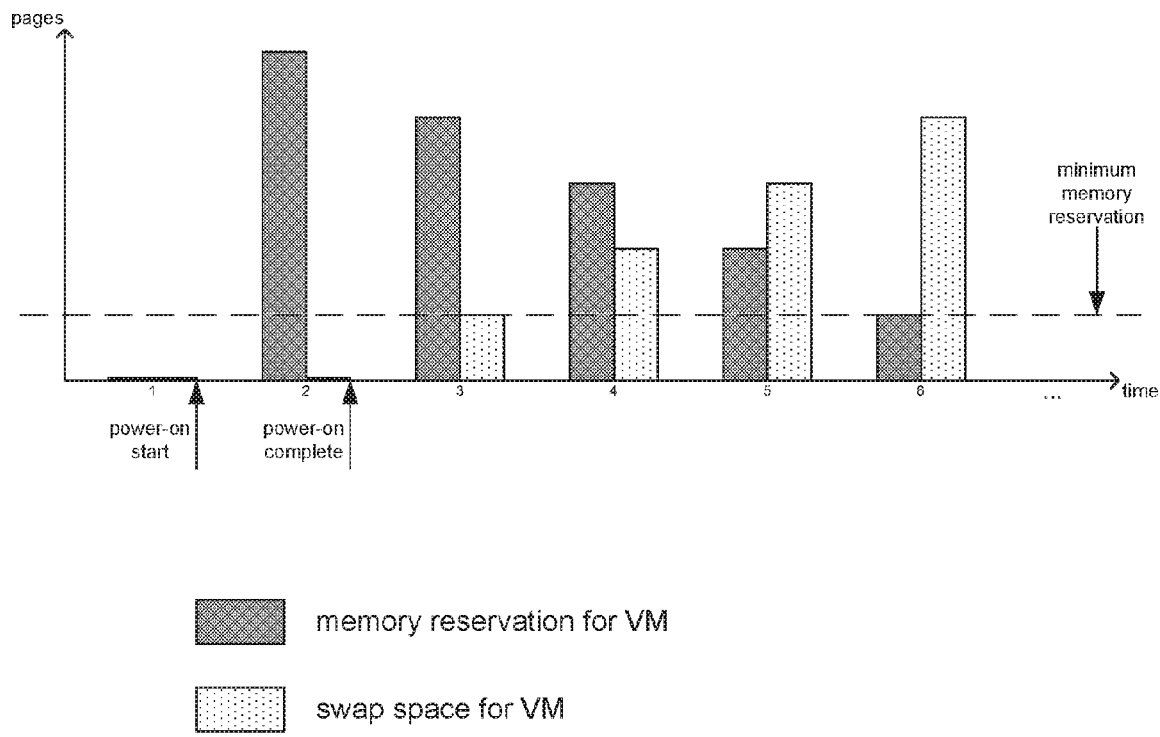
FIG. 4 is a chart depicting an example timeline for powering on a VM and iteratively growing a swap space and decreasing a memory reservation for a VM, according to one or more embodiments.

FIG. 4 illustrates an example timeline of VM power-on operations and subsequent memory reservation and swap space size changes, according to an embodiment. As illustrated, at time 1, no memory reservation or swap reservation exists for a VM. Subsequently, hypervisor 120 begins power-on operations for a VM. At time 2, a memory reservation for the VM equals the size of the virtual memory space, and the VM is allocated a swap space with a size of 0. Because the virtual memory space is completely backed by a combination of a memory reservation and swap space, the hypervisor 120 can declare that power-on operations are completed and that the VM may begin operations.

In subsequent time periods, the memory reservation is reduced in size by M storage blocks (or memory pages), and a corresponding allocation of M storage blocks is added to the swap space for the VM. Finally, at time period 6, the memory reservation for the VM reaches the minimum memory reservation, which is, as discussed above, the minimum amount of the virtual address space that is guaranteed to be backed by machine memory. Because hypervisor 120 may not perform any further reductions in the memory reservation for the VM, the size of the memory reservation and the swap space for the VM may remain as illustrated at time period 6 until the VM is powered down.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method comprising:
   initiating a power-on procedure for a virtual machine on a host machine, wherein the virtual machine comprises a virtual memory space configured to be backed by a combination of physical persistent storage and physical machine memory available to the host machine;
   allocating, prior to completing the power-on procedure, a portion of the physical machine memory to the virtual memory space of the virtual machine, wherein a size of the allocated portion of the physical machine memory is greater than a minimum memory reservation setting of the virtual machine, the minimum memory reservation setting indicating a minimum amount of the virtual memory space that is to be backed by the physical machine memory;
   allocating, prior to completing the power-on procedure, a portion of the physical persistent storage to the virtual memory space of the virtual machine as a swap space, wherein a size of the allocated portion of the physical persistent storage is less than the difference between a virtual memory space size setting of the virtual memory space and the minimum memory reservation setting, the virtual memory space size setting indicating the size of the virtual memory space;
   completing the power-on procedure of the virtual machine; and
   subsequent to completing the power-on procedure of the virtual machine, iteratively increasing the size of the allocated portion of the physical persistent storage and decreasing the size of the allocated portion of the physical machine memory.

2. The method of claim 1, wherein if the virtual memory space size setting exceeds available space of the physical machine memory, the portion of the physical memory allocated to the virtual memory space is the available space of the physical memory, and a the size of the allocated portion of the physical persistent storage is equal to the difference between the virtual memory space size setting and the available space of the physical machine memory.

3. The method of claim 1, wherein iteratively increasing the size of the allocated portion of the physical persistent storage and decreasing the size of the allocated portion of the physical machine memory comprises iteratively allocating a fixed number of memory pages to the physical persistent storage and deallocating the fixed number of memory pages from the physical machine memory.

4. The method of claim 1, wherein iteratively increasing the size of the allocated portion of the physical persistent storage and decreasing the size of the allocated portion of the physical machine memory comprises iteratively deallocating memory pages from the physical machine memory until the size of the allocated physical memory space equals the minimum memory reservation setting.

5. The method of claim 1, further comprising:
   determining that the minimum memory reservation setting exceeds available space of the physical machine memory; and
   discontinuing power-on operations for the virtual machine.

6. The method of claim 1, further comprising:
   detecting a failure to increase the size of the allocated portion of the physical persistent storage; and
   based on the detected failure, discontinuing iteratively increasing the size of the allocated portion of the physical persistent storage and decreasing the size of the allocated portion of the physical machine memory.

7. A non-transitory computer readable medium comprising instructions that, when executed, performs an operation comprising:
   initiating a power-on procedure for a virtual machine on a host machine, wherein the virtual machine comprises a virtual memory space configured to be backed by a combination of physical persistent storage and physical machine memory available to the host machine;
   allocating, prior to completing the power-on procedure, a portion of the physical machine memory to the virtual memory space of the virtual machine, wherein a size of the allocated portion of the physical machine memory is greater than a minimum memory reservation setting of the virtual machine, the minimum memory reservation setting indicating a minimum amount of the virtual memory space that is to be backed by the physical machine memory;
   allocating, prior to completing the power-on procedure, a portion of the physical persistent storage to the virtual memory space of the virtual machine as a swap space, wherein a size of the allocated portion of the physical persistent storage is less than the difference between a virtual memory space size setting of the virtual memory space and the minimum memory reservation setting, the virtual memory space size setting indicating the size of the virtual memory space;
   completing the power-on procedure of the virtual machine; and
   subsequent to completing the power-on procedure of the virtual machine, iteratively increasing the size of the allocated portion of the physical persistent storage and decreasing the size of the allocated portion of the physical machine memory.

8. The non-transitory computer readable medium of claim 7, wherein if the virtual memory space size setting exceeds available space of the physical machine memory, the portion of the physical memory allocated to the virtual memory space is the available space of the physical memory, and a the size of the allocated portion of the physical persistent storage is equal to the difference between the virtual memory space size setting and the available space of the physical machine memory.

9. The non-transitory computer readable medium of claim 7, wherein iteratively increasing the size of the allocated portion of the physical persistent storage and decreasing the size of the allocated portion of the physical machine memory comprises iteratively allocating a fixed number of memory pages to the physical persistent storage and deallocating the fixed number of memory pages from the physical machine memory.

10. The non-transitory computer readable medium of claim 7, wherein iteratively increasing the size of the allocated portion of the physical persistent storage and decreasing the size of the allocated portion of the physical machine memory comprises iteratively deallocating memory pages from the physical machine memory until the size of the allocated physical memory space equals the minimum memory reservation settings.

11. The non-transitory computer readable medium of claim 7, wherein the operations further comprise:
  determining that the minimum memory reservation setting exceeds available space of the physical machine memory; and
  discontinuing power-on operations for the virtual machine.

12. The non-transitory computer readable medium of claim 7, wherein the operations further comprise:
  detecting a failure to increase the size of the allocated portion of the physical persistent storage; and
  based on the detected failure, discontinuing iteratively increasing the size of the allocated portion of the physical persistent storage and decreasing the size of the allocated portion of the physical machine memory.

13. A computer system comprising:
  one or more processors;
  physical machine memory;
  physical persistent storage; and
  host physical memory having installed therein virtualization software for carrying out operations for rapidly powering on virtual machines (VMs) that includes the steps of:
    initiating a power-on procedure for a virtual machine, wherein the virtual machine comprises a virtual memory space configured to be backed by a combination of the physical persistent storage and the physical machine memory;
    allocating, prior to completing the power-on procedure, a portion of the physical machine memory to the virtual memory space of the virtual machine, wherein a size of the allocated portion of the physical machine memory is greater than a minimum memory reservation setting of the virtual machine, the minimum memory reservation setting indicating a minimum amount of the virtual memory space that is to be backed by the physical machine memory;
    allocating, prior to completing the power-on procedure, a portion of the physical persistent storage to the virtual memory space of the virtual machine as a swap space, wherein a size of the allocated portion of the physical persistent storage is less than the difference between a virtual memory space size setting of the virtual memory space and the minimum memory reservation setting, the virtual memory space size setting indicating the size of the virtual memory space;
    completing the power-on procedure of the virtual machine; and
    subsequent to completing the power-on procedure of the virtual machine, iteratively increasing the size of the allocated portion of the physical persistent storage and decreasing the size of the allocated portion of the physical machine memory.

14. The computer system of claim 13, wherein if the virtual memory space size setting exceeds available space of the physical machine memory, the portion of the physical memory allocated to the virtual memory space is the available space of the physical memory, and a the size of the allocated portion of the physical persistent storage is equal to the difference between the virtual memory space size setting and the available space of the physical machine memory.

15. The computer system of claim 13, wherein iteratively increasing the size of the allocated portion of the physical persistent storage and decreasing the size of the allocated portion of the physical machine memory comprises iteratively allocating a fixed number of memory pages to the physical persistent storage and deallocating the fixed number of memory pages from the physical machine memory.

16. The computer system of claim 13, wherein iteratively increasing the size of the allocated portion of the physical persistent storage and decreasing the size of the allocated portion of the physical machine memory comprises iteratively deallocating memory pages from the physical machine memory until the size of the allocated physical memory space equals the minimum memory reservation setting.

17. The computer system of claim 13, wherein the operations further comprise:
  determining that the minimum memory reservation setting exceeds available space of the physical machine memory; and
  discontinuing power-on operations for the virtual machine.

18. The computer system of claim 13, wherein the operations further comprise:
  detecting a failure to increase the size of the allocated portion of the physical persistent storage; and
  based on the detected failure, discontinuing iteratively increasing the size of the allocated portion of the physical persistent storage and decreasing the size of the allocated portion of the physical machine memory.

* * * * *